United States Patent

Beauchamp

[15] 3,653,967

[45] Apr. 4, 1972

[54] POSITIVE ELECTRODE FOR USE IN NICKEL CADMIUM CELLS AND THE METHOD FOR PRODUCING SAME AND PRODUCTS UTILIZING SAME

[72] Inventor: Richard Lawrence Beauchamp, Madison, N.J.

[73] Assignee: Bell Telephone Laboratories, Incorporated, Murray Hill, N.J.

[22] Filed: Jan. 9, 1970

[21] Appl. No.: 1,885

[52] U.S. Cl. .................................................................136/75
[51] Int. Cl. .........................................................H01m 35/18
[58] Field of Search.....................136/29, 28, 24, 30, 31, 20, 136/34, 76, 68, 75, 77–78, 6; 204/37, 38, 56

[56] References Cited

UNITED STATES PATENTS

| | | | |
|---|---|---|---|
| 3,282,808 | 11/1966 | Kandler | 204/37 |
| 3,203,879 | 8/1965 | Mueller | 204/56 |
| 3,507,699 | 4/1970 | Pell et al. | 136/76 |
| 3,356,534 | 12/1967 | Ackermann | 136/6 |
| 3,507,697 | 4/1970 | Korman | 136/29 |
| 3,533,842 | 10/1970 | Hart | 136/29 |
| 3,442,710 | 5/1969 | Menard | 136/29 |
| 3,288,643 | 11/1966 | Stark | 136/24 |
| 3,274,028 | 9/1966 | Okinaka et al. | 136/29 |
| 3,258,361 | 6/1966 | Kahn | 136/24 |

*Primary Examiner*—Anthony Skapars
*Attorney*—R. J. Guenther and Edwin B. Cave

[57] ABSTRACT

The electrolytic deposition of nickel hydroxide in a porous electrode structure is carried out within the critical temperature range of from about 85° C to the boiling point of the electrolyte, resulting in the formation of high energy density positive electrodes for alkaline nickel cadmium cells. In addition, the electrodes exhibit a high percent utilization of active material and resist flaking or shedding of the active material during formation and cell use.

9 Claims, No Drawings

POSITIVE ELECTRODE FOR USE IN NICKEL CADMIUM CELLS AND THE METHOD FOR PRODUCING SAME AND PRODUCTS UTILIZING SAME

BACKGROUND OF THE INVENTION

1. Field of the Invention

This invention relates to a method for forming a product which is useful as the positive electrode of an alkaline nickel cadmium cell, essentially by the electrolytic deposition of nickel hydroxide in a porous structure, and to the resultant product, and to cells containing the product.

2. Prior Art

Electrodes for use in energy-supplying alkaline nickel-cadmium electrolytic cells desirably exhibit high energy densities and high percent utilization of active material, in order to contribute to a long and efficient cell life. A commercially established approach to the achievement of these characteristics is the filling of a porous electrode structure with finely divided active material so as to present a high surface area of a substantial amount of material to the electrolyte. In practice, however, difficulty has been experienced in the achievement of high loading of the porous structures, while maintaining a good percent utilization of active material.

One widely known and frequently practiced method is that of vacuum impregnation, in which the porous structure is filled under vacuum with an aqueous solution of a nickel salt. The salt is reduced to the hydroxide by treatment with an alkaline solution, and the liquid allowed to evaporate, leaving the hydroxide. The amount of material loaded at one time is, of course, limited by the solubility of the salt in the aqueous solution. Typically, at least four impregnation cycles, requiring four or five days to complete, are required to achieve commercially acceptable electrodes by this method.

Another method is described in U.S. Pat. No. 3,214,355 issued to Ludwig Kandler on Oct. 26, 1965, involving the electrolytic deposition of nickel hydroxide directly in the pores of the electrode structure as a cathode. This is carried out in an acid electrolyte containing nickel ions and reducible ions, the redox potential of which is more positive than that of the nickel ions. During the electrolysis, the reducible ions, for example, nitrate ions, prevent the reduction of the nickel ions within the cathode structure by themselves being reduced. The resultant consumption of hydrogen ions increases the pH value of the electrolyte within the cathode structure to the extent that slow precipitation of nickel hydroxide results.

However, when this impregnation process is carried out under normal operating conditions, the maximum loading of the electrode structure obtained is approximately 1.17 grams per cubic centimeter of void volume. Increasing the time of impregnation generally results in a decrease in the amount of active material retained after forming and in the accumulation of material on the outside surface of the structure. When increased loading in obtained, for example, by changing the conditions of impregnation or repeating the process, it has been observed that a decrease in percent utilization of active material occurs.

SUMMARY OF THE INVENTION

It has now been discovered that carrying out the electrolytic deposition of nickel hydroxide in a porous electrode structure within the critical temperature range of from about 85° C to the boiling point of the electrolyte results in a finely divided deposit having a large active surface area, leading to increased loading, increased percent utilization of active material, particularly at high loading levels, and resistance of the electrode to flaking and shedding of the deposit during formation and cell use.

Such filled structures may subsequently be treated electrolytically with an alkaline solution so as to activate the nickel hydroxide prior to their incorporation into electrolytic cells such as alkaline nickel cadmium cells as positive electrodes.

In a preferred embodiment, an alkali metal nitrite is added to the electrolyte solution in order to stabilize the pH of the bulk thereof during impregnation.

DETAILED DESCRIPTION OF THE INVENTION

It is essential to the successful practice of the invention that the deposition of nickel hydroxide be carried out within the critical temperature range of from about 85° C to the boiling point of the electrolyte, since only within this temperature range are the nickel hydroxide crystals precipitated of such a nature as to result in an electrode having a highly loaded, uniform deposit having a large active surface area. Since the amount as well as the rate of loading tend to increase with increasing temperature, it is preferred for optimum results to operate at a temperature at or near the boiling point of the electrolyte solution.

The ionic species which must be present in the electrolyte solution are nickel ions and a reducible species, the redox potential of which is more positive than that of nickel ions such, for example, as chromic acid ions, chlorate ions, permanganate ions, or nitrate ions. Nitrate ions are particularly suitable for this purpose and it has been found convenient to add both ionic species as nickel nitrate, $Ni(NO_3)_2$, or a hydrated form, such as $Ni(NO_3)_2 \cdot 4H_2O$, although both species need not be present in the same amount.

The time required for the deposition of nickel hydroxide in the pores of the electrode structure is dependent upon the current density on the surface of the structure as a cathode, and the concentration of the ionic species in the electrolyte solution. Although these parameters are not critical, a suitable electrode being obtainable under a variety of conditions, nevertheless there exist preferred operating conditions. For example, in a practical process it is preferred to keep impregnation time as short as possible and to this end it is preferred to adjust solution concentration and current density accordingly.

Optimum loading conditions correspond to concentrations of each ion within the range of 1.5 to 3.0M. and current densities of 4 to 8 amps. per square meter. Exceeding these ranges in either direction results in a decrease in the level of loading for a given amount of charge (amp. hours). For these optimum loading conditions, the time of deposition should in general not exceed about 1 hour to 2 hours, the shorter times corresponding to the higher current densities, beyond which the deposit tends to build up on the surface of the porous structure.

It is stressed, however, that these are preferred ranges and that adequate loading may be obtained under other conditions of current and concentration where longer impregnation times are tolerable. It is, of course, essential that the concentration of nickel ions and reducible ions be sufficient so that their rate of replenishment within the pores of the cathode from the bulk of the solution is adequate to prevent the zone of precipitation from moving toward the outside of the porous structure.

Since it is imperative that the impregnation process be carried out at elevated temperatures, the selection of a corrosion-resistant material for use as counterelectrodes, such as nickel, stainless steel or platinum, may be desirable. However, if one of these materials is used, it may be desirable to insure against abrupt and substantial changes in pH of the electrolyte solution during electrolysis. Such may be accomplished by the use of a supporting electrolyte which is compatible with the chemistry of the electrolyte solution and is preferentially oxidized at the platinum anodes during electrolysis. Examples of suitable supporting electrolytes are the alkali nitrites such as sodium or potassium nitrite, in an amount which is sufficient to prevent oxygen evolution at the counterelectrodes throughout the period of impregnation, and may typically range from 0.1M. to saturation.

It may be necessary, due to the particular combination of operating conditions and electrolyte compositions chosen, to adjust the pH of the electrolyte prior to or during deposition. As is known such may be accomplished simply by the addition of a solution of an acid or base, such as nitric acid or potassium hydroxide.

EXAMPLE I

A series of sintered nickel plaques of similar size and porosity were prepared. One set of 12 plaques was impregnated at room temperature in a 4M solution of $Ni(NO_3)_2$ at a current of 3 amps for about 8.5 minutes. A second set of 12 plaques was impregnated according to the invention in a boiling solution of 2M. $Ni(NO_3)_2$ and 0.3M. $NaNO_2$ at a current of 1 amp for about 30 minutes. Each set of plaques was activated by cycling in a 30 percent solution of potassium hydroxide at about the same charge and discharge rates. The results are shown in Table I, and are expressed as the average values of theoretical capacity (ampere hour) after forming and percent utilization of active material (measured capacity divided by theoretical capacity).

TABLE I

| | Theoretical capacity (amp.Hr.) | Percent Utilization |
|---|---|---|
| Set 1 | 0.220 | 105 |
| Set 2 | 0.240 | 122 |

These results indicate that under conditions of impregnation which result in about the same loading levels, the inventive process results in a significantly increased value of percent utilization over that of the room temperature process.

EXAMPLE II

Three sets of sintered nickel plaques of similar size and porosity were prepared. Each set was impregnated by a different method and under a variety of conditions in order to discover the optimum loading obtainable for each method. The first set was loaded by the vacuum impregnation method as follows. The plaques were immersed in an aqueous solution of 4.0M $Ni(NO_3)_2$ under vacuum for a time of 5 minutes, removed and treated electrolytically as a cathode in a hot 25 percent solution of potassium hydroxide for a time of 20 minutes at a current of 5 amps in order to convert the $Ni(NO_3)_2$ to $Ni(OH)_2$. Next, the plaques were removed from the electrolytic solution and allowed to dry overnight. It was found that optimum loading was obtained when these steps were repeated from 10 to 11 times. The second set was loaded by the electrolytic method. Optimum loading was obtained as follows. The plaques were treated cathodically in 4M $Ni(NO_3)_2$ solution at room temperature for about ten minutes and at a current of 5 amps. The third set was also loaded by the electrolytic method, but in accordance with the invention. Optimum loading was obtained for a boiling electrolyte containing 2M $Ni(NO_3)_2$ and 0.3M $NaNO_2$ at a current of 1 amp. for about 90 minutes.

Results were obtained as amount of active material loaded (grams per cubic centimeter), theoretical capacity and measured capacity after forming (ampere hours) and percent utilization of active material. Forming in each case consisted of subjecting the loaded plaques to at least one charge-discharge cycle in an electrolyte solution containing about 30 percent potassium hydroxide, at charge and discharge currents of 0.150 amps. and 0.075 amp., respectively. Results are shown in Table II.

TABLE II

| | Loading (grams/cc) | Theoretical Capacity (amp.hr.) | Measured Capacity (amp.hr.) | Percent Utilization |
|---|---|---|---|---|
| Vacuum Impregnation | 1.36 | 0.322 | 0.290 | 90 |
| Electrolytic (Rm. Temp.) | 1.17 | 0.275 | 0.313 | 114 |
| Electrolytic (Elevated Temp.) | 1.93 | 0.416 | 0.499 | 120 |

It will be noted that significantly increased loading and capacity and higher energy density cells are obtainable by use of the inventive method, as compared to either of the other methods. In addition, improved percent utilization of active material is also obtainable by the inventive method.

The invention has been described in terms of a limited number of embodiments. However, it essentially teaches a method for impregnating a porous conductive structure with nickel hydroxide. Other embodiments are, therefore, contemplated. For example, while commercially acceptable electrodes are obtainable with only one impregnation, it may be desirable to increase loading even further by the use of two or more impregnation cycles. In addition, since the process is of greatest commercial significance with relation to the production of electrodes for electrolytic cells, it is contemplated that after impregnation the nickel hydroxide will be activated in accordance with procedures known in the art, such as electrolytic treatment in a solution of potassium hydroxide (comprising at least one charge-discharge cycle). In addition to its use as a negative electrode in alkaline nickel-cadmium cells, the product is, of course, also useful in other electrolytic cells, such as nickel-zinc cells.

While ordinarily operation at atmospheric pressure is contemplated, in special instances it may be found desirable to operate at higher pressures, (and thus at higher boiling temperatures).

I claim:

1. A method for introducing nickel hydroxide into a porous electrically conductive structure which comprises electrolyzing, with the porous structure as cathode, an acid electrolyte containing ions of nickel and reducible ions, the redox potential of which is more positive than the redox potential of the nickel ions, said acid electrolyte being maintained at a temperature of from about 85° C. to its boiling point during electrolysis, characterized in that the electrolyte additionally contains nitrite ions in the amount of about 0.1 molar to saturation 2. The method of claim 1 in which the porous electrically conductive structure is a sintered nickel plaque.

3. The method of claim 1 in which the reducible ions are nitrate ions.

4. The method of claim 3 in which the nickel ions and nitrate ions are each present in the electrolyte in the amount of from 1.5 to 3 molar, and in which said electrolysis is carried out at a current density of from 4 to 8 amps per square meter.

5. The method of claim 4 in which said electrolysis is carried out for a time of from 1 hour to 2 hours, the shorter times corresponding to higher current densities.

6. The method of claim 1 in which said electrolysis is followed by treating the porous structure electrolytically in an alkaline solution so as to activate the nickel hydroxide therein.

12. The product produced by the method of claim 1.

8. An alkaline nickel-cadmium electrolytic cell containing a positive electrode produced by the method of claim 1.

9. An alkaline nickel-zinc electrolytic cell containing a positive electrode produced by the method of claim 1.

* * * * *